United States Patent Office.

J. B. NEWBROUGH AND EDWARD FAGAN, OF NEW YORK, N. Y.

Letters Patent No. 73,916, dated January 28, 1868.

IMPROVEMENT IN THE MANUFACTURE OF ARTICLES OF RUBBER, GUTTA PERCHA, &c.

The Schedule referred to in these Letters Patent and making part of the same.

TO ALL WHOM IT MAY CONCERN:

Be it known that we, J. B. NEWBROUGH and E. FAGAN, of New York, have invented an Improvement in the Manufacture of Articles of Rubber, Gutta Percha, and similar gums; and we do hereby declare the following to be a full, clear, and exact description of the same.

Gutta percha, rubber, or other similar gum, after being moulded, carved, or otherwise reduced to any desired shape, is immersed in bromine, and is maintained in the same for such a length of time that, after the article is withdrawn and exposed to the air, the gum will become hardened and otherwise changed in its character, so that it can be applied to purposes for which the gum, in its natural state, could not be used.

In order to prevent the gum from hardening to any extent before it is withdrawn from the bromine, chloroform, or equivalent solvent of the gum, may be added to the bromine, in the proportion of nine parts of the latter to one of chloroform, and the article of gum is either immersed in the composition, or a portion of gum is dissolved in the same, and the solution is applied, in successive layers or coatings, to a mould on which an article is to be formed, or as a coating to articles of other materials which require to be covered, the gum hardening on the evaporation of the chloroform.

We claim as our invention, and desire to secure by Letters Patent—

The manufacture of articles of utility or ornament, by subjecting rubber, gutta percha, or similar gum, either before or after it is formed of the desired shape, to the action of bromine, substantially as described.

In testimony whereof, we have signed our names to this specification in the presence of two subscribing witnesses.

J. B. NEWBROUGH,
E. FAGAN.

Witnesses:
CHARLES E. FOSTER,
C. P. HARTT.